United States Patent
Ahn et al.

(10) Patent No.: US 9,288,461 B2
(45) Date of Patent: Mar. 15, 2016

(54) APPARATUS AND METHOD FOR PROCESSING IMAGE, AND COMPUTER-READABLE STORAGE MEDIUM

(75) Inventors: Eun-sun Ahn, Suwon-si (KR); Jin-pyo Gwak, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 842 days.

(21) Appl. No.: 12/985,418

(22) Filed: Jan. 6, 2011

(65) Prior Publication Data

US 2011/0221932 A1 Sep. 15, 2011

(30) Foreign Application Priority Data

Mar. 12, 2010 (KR) ........................ 10-2010-0022436

(51) Int. Cl.
*H04N 9/74* (2006.01)
*H04N 5/262* (2006.01)
*G06T 5/00* (2006.01)
*H04N 5/235* (2006.01)

(52) U.S. Cl.
CPC *H04N 9/74* (2013.01); *G06T 5/009* (2013.01); *H04N 5/235* (2013.01); *H04N 5/2355* (2013.01); *H04N 5/262* (2013.01)

(58) Field of Classification Search
CPC ............ H04N 9/68; H04N 9/74; H04N 5/262
USPC ......... 348/234–235, 239–242, 248, 252, 254; 382/163, 167, 274
See application file for complete search history.

(56) References Cited

U.S. PATENT DOCUMENTS

| | | | | |
|---|---|---|---|---|
| 5,452,017 A * | 9/1995 | Hickman | ............... | H04N 9/643 348/646 |
| 6,157,394 A * | 12/2000 | Anderson et al. | ............. | 345/506 |
| 6,198,844 B1 * | 3/2001 | Nomura | ........................ | 382/168 |
| 6,469,747 B1 * | 10/2002 | Rai | ........................ | H04N 5/265 348/584 |
| 6,804,409 B2 * | 10/2004 | Sobol et al. | ................... | 382/274 |
| 7,027,088 B1 * | 4/2006 | Kuwata et al. | ................ | 348/234 |
| 7,215,813 B2 * | 5/2007 | Graves et al. | ................. | 382/167 |
| 8,279,349 B2 * | 10/2012 | Shmueli et al. | ............... | 348/645 |
| 8,406,482 B1 * | 3/2013 | Chien et al. | ................... | 382/118 |
| 2005/0212825 A1 * | 9/2005 | Lee et al. | ...................... | 345/690 |
| 2006/0221260 A1 * | 10/2006 | Fujine et al. | ................. | 348/790 |
| 2008/0080784 A1 * | 4/2008 | Ozdemir | ............. | H04N 1/6005 382/274 |
| 2009/0066819 A1 * | 3/2009 | Ando | ............................ | 348/254 |
| 2009/0303199 A1 * | 12/2009 | Cho et al. | ...................... | 345/173 |
| 2013/0120442 A1 * | 5/2013 | Dhawan | ........................ | 345/629 |

FOREIGN PATENT DOCUMENTS

KR 10-2005-0018256 A 2/2005

OTHER PUBLICATIONS

Office Action issued for related application KR 10-2010-0022436, Jan. 15, 2016, 9 pages.

* cited by examiner

*Primary Examiner* — Twyler Haskins
*Assistant Examiner* — Akshay Trehan
(74) *Attorney, Agent, or Firm* — Drinker Biddle & Reath LLP (57) ABSTRACT

An apparatus and a method for processing an image. The method includes: increasing contrast of an input image to generate a first image; adding a mask having a pattern showing an image effect, to the first image to generate a second image; and adjusting a range of pixel values of the second image to generate a resultant image.

16 Claims, 11 Drawing Sheets

APPARATUS AND METHOD FOR PROCESSING IMAGE, AND COMPUTER-READABLE STORAGE MEDIUM

CROSS-REFERENCE TO RELATED PATENT APPLICATION

This application claims the benefit of Korean Patent Application No. 10-2010-0022436, filed on Mar. 12, 2010, in the Korean Intellectual Property Office, the entire disclosure of which is incorporated herein by reference.

BACKGROUND

1. Field of the Invention

The invention relates to an apparatus and a method for applying an image effect to an input image when processing the input image, and a computer-readable storage medium having embodied thereon a computer program for executing the method.

2. Description of the Related Art

Various types of image apparatuses such as digital cameras, cellular phones, camcorders, and mobile type image apparatuses are in wide use. Often, users of the mobile image apparatuses want image processing functions that are currently only provided on general purpose computers. However, resources on mobile image apparatuses are limited in comparison with resources on general purpose computers, so it may be difficult to provide the same image processing functions on the mobile image apparatuses that users have become use to on general purpose computers.

SUMMARY

Therefore there is a need in the art for an apparatus, computer useable medium, and a method of processing an image. The method of processing an image including increasing contrast of an input image to generate a first image; adding a mask having a pattern showing an image effect to the first image to generate a second image; and adjusting a range of pixel values of the second image to generate a resultant image.

The contrast of the input image may be increased by using a first look-up table (LUT) to generate the first image, and the range of the pixel values of the second image may be adjusted by using a second LUT to generate the resultant image.

The first LUT may be configured to adjust pixel values in a $1\text{-}1^{st}$ range corresponding to a low pixel value range to a minimum value of the pixel values, increase contrast of pixel values in a $1\text{-}2^{nd}$ range corresponding to an intermediate pixel value range, and adjust pixel values in a $1\text{-}3^{rd}$ range corresponding to an upper pixel value range to a maximum value of the pixel values.

The method may further include adjusting a range of the pixel values in the $1\text{-}2^{nd}$ range to adjust a range of pixel values to which the image effect will be applied. The method may further include adjusting ranges of the pixel values in the $1\text{-}1^{st}$ and $1\text{-}3^{rd}$ ranges to adjust a tone of the resultant image.

The second LUT may be configured to adjust pixel values in a $2\text{-}1^{st}$ range of the second image corresponding to a low pixel value range to a minimum value of the pixel values and wholly reduce pixel values in a $2\text{-}2^{nd}$ range of the second image.

The method may further include adjusting a range of the pixel values in the $2\text{-}1^{st}$ range to adjust a range of pixel values of the resultant image from which the image effect will be removed. The second LUT may be configured to wholly reduce the pixel values of the second image in such a way that a total range of pixel values of the resultant image corresponds to a total range of pixel values of the input image.

The input image may be an image captured by a digital photographing apparatus, and the resultant image may be a live-view image of the digital photographing apparatus, wherein the method further includes displaying the resultant image as the live-view image.

The pixel values may be brightness values.

The method may further include removing a color component from the resultant image.

The image effect may be at least one of a sketch effect, a halftone dot effect, and a blurry television (TV) effect.

According to another aspect of the invention, there is provided an apparatus for processing an image, including: a first processor for increasing contrast of an input image to generate a first image; a mask applier for adding a mask having a pattern showing an image effect to the first image to generate a second image; and a second processor for adjusting a range of pixel values of the second image to generate a resultant image.

The first processor may include a first LUT applier for increasing the contrast of the input image by using a first LUT, and the second processor may include a second LUT applier for adjusting the range of the pixel values of the second image by using a second LUT.

The first LUT may be configured to adjust pixel values in a $1\text{-}1^{st}$ range of the first image corresponding to a low pixel value range to a minimum value of the pixel values, increase contrast of pixel values in a $1\text{-}2^{nd}$ range of the first image corresponding to an intermediate pixel value range, and adjust pixel values in a $1\text{-}3^{rd}$ range of the first image corresponding to an upper pixel value range to a maximum value of the pixel values.

The first processor may include a first effect range determiner for adjusting a range of the pixel values in the $1\text{-}2^{nd}$ range to adjust a range of pixel values to which the image effect will be applied. The first processor may include a tone adjuster for adjusting ranges of the pixel values in the $1\text{-}1^{st}$ and $1\text{-}3^{rd}$ ranges to adjust a tone of the resultant image.

The second LUT may be configured to adjust pixel values in a $2\text{-}1^{st}$ range of the second image corresponding to a low pixel value range to a minimum value of the pixel values and wholly reduce pixel value of a $2\text{-}2^{nd}$ range of the second image.

The apparatus may further include a second effect range determiner for adjusting a range of the pixel values in the $2\text{-}1^{st}$ range to adjust a range of pixel values of the resultant image from which the image effect will be removed. The second LUT may be configured to wholly reduce the pixel values of the second image in such a way that a total range of pixel values of the resultant image corresponds to a total range of pixel values of the input image.

The apparatus may further include a photographing unit for converting an input optical signal into an electric signal to capture an image of a subject, wherein the input image is an image captured by the photographing unit, and the resultant image is a live-view image, wherein the apparatus further includes a live-view provider for displaying the resultant image as the live-view image.

The apparatus may further include a color component remover for removing a color component from the resultant image.

According to another aspect of the invention, there is provided a computer-readable storage medium storing a computer program including: a code part for increasing contrast of an input image to generate a first image; a code part for adding a mask having a pattern showing an image effect to the first image to generate a second image; and a code part for adjusting a range of pixel values of the second image to generate a resultant image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The following descriptions and the attached drawings are for understanding operation of embodiments of the invention. Parts of the operation that may be easily realized by those skilled in the art may be omitted.

The specification and the drawings are not provided for limiting the invention, and a scope of the invention should be defined by the appended claims. The terminology used herein should be construed as meanings and concepts agreeing with the spirit of the invention, in order to most appropriately express the invention.

Exemplary embodiments of the invention will now be described with reference to the attached drawings.

Figure 1:
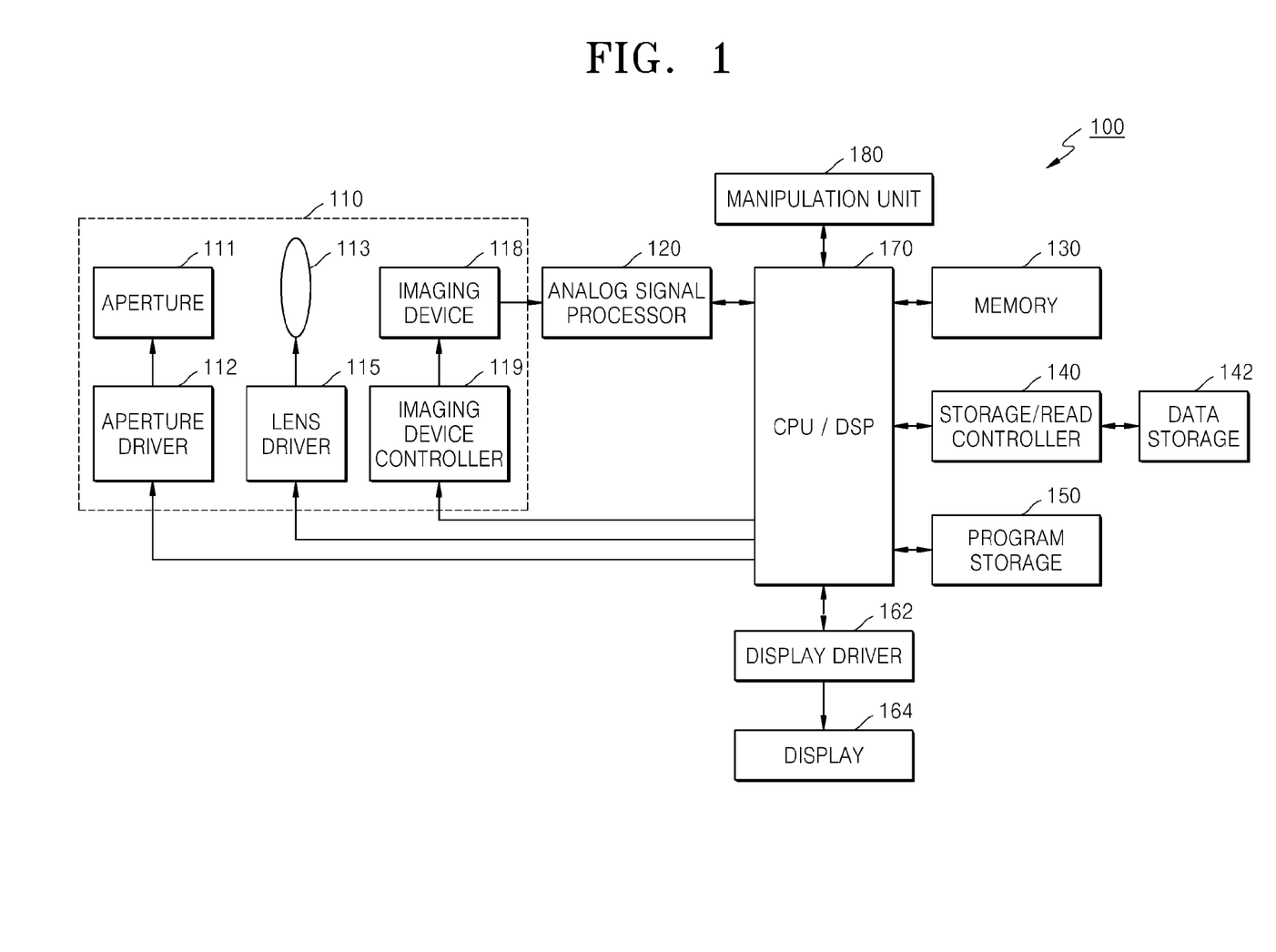
FIG. 1 is a block diagram of an apparatus for processing an image according to an exemplary embodiment of the invention.

FIG. 1 is a block diagram of an apparatus 100 for processing an image according to an exemplary embodiment of the invention.

Referring to FIG. 1, the apparatus 100 according to the embodiment may be realized as a digital photographing apparatus having a photographing function. Also, an image input to the apparatus 100 may be an image that is to be captured by the digital photographing apparatus. A schematic structure of the apparatus 100 of FIG. 1 as a digital photographing apparatus will now be described.

The apparatus 100 includes a photographing unit 110, an analog signal processor 120, a memory 130, a storage/read controller 140, a data storage 142, a program storage 150, a display driver 162, a display 164, a central processing unit (CPU)/digital signal processor (DSP) 170, and a manipulation unit 180.

An overall operation of the apparatus 100 is controlled by the CPU/DSP 170. The CPU/DSP 170 provides an aperture driver 112, a lens driver 115, and an imaging device controller 119 with control signals for controlling operations of the aperture driver 112, the lens driver 115, and the imaging device controller 119.

The photographing unit 110 is an element that generates an electric signal corresponding to an image from incident light and includes an aperture 111, the aperture driver 112, a lens 113, the lens driver 115, an imaging device 118, and the imaging device controller 119.

Opening and closing of the aperture 111 are controlled by the aperture driver 112, and the aperture 111 controls an amount of light incident onto the imaging device 118.

The lens 113 may include a plurality of lenses including a zoom lens, a focus lens, and the like. Positioning of the lenses of the lens 113 is controlled by the lens driver 115. The lens driver 115 positions the lenses of the lens 113 according to a control signal provided from the CPU/DSP 170.

An optical signal passed through the aperture 111 and the lens 113 forms an image of a subject on a light-receiving surface of the imaging device 118. The imaging device 118 may be a charge-coupled device (CCD) image sensor or a complementary metal oxide semiconductor (CMOS) image sensor (CIS) that converts an optical signal into an electric signal. Sensitivity and the like of the imaging device 118 are controlled by the imaging device controller 119. The imaging device controller 119 controls the imaging device 118 according to a control signal automatically generated according to an image signal input in real time or a control signal manually input by a user.

An exposure time of the imaging device 118 is controlled by a shutter (not shown). The shutter may be a mechanical shutter, such as a screen that can move to control an amount of incident light, or an electronic shutter, such as by providing the imaging device 118 with an electric signal to control the exposure time.

The analog signal processor 120 performs noise reduction processing, gain control processing, wave shaping processing, analog-to-digital conversion processing, and the like with respect to an analog signal provided from the image device 118.

A signal processed by the analog signal processor 120 may be input to the CPU/DSP 170 through the memory 130 or may be input directly to the CPU/DSP 170 without passing through the memory 130. Here, the memory 130 operates as a main memory of the apparatus 100 and temporarily stores information when the CPU/DSP 170 is operating. The program storage 150 stores an operating system of the apparatus 100 and programs of the operating system and the like.

The apparatus 100 includes the display 164 to display an operation state of the apparatus 100 or image information captured by the apparatus 100. The display 164 may provide visual information and/or audio information to a user. The display 164 may be a liquid crystal display (LCD) panel, an organic light-emitting display (OLED) panel, or the like to provide the visual information. The display 164 may also be a touch screen to recognize a touch input.

The display driver 162 provides a driving signal to the display 164.

The CPU/DSP 170 processes an image signal that is input to the CPU/DSP 170 and controls elements of the apparatus 100 according to the image signal or an external input signal. The CPU/DSP 170 performs image signal processing for improving an image quality, including noise reduction, gamma correction, color filter array interpolation, color matrix, color correction, color enhancement, and the like, with respect to input image data. The CPU/DSP 170 compresses image data generated by performing the image signal processing for improving the image quality to generate an image file or recovers image data from an image file. Compression of image data may be done in a reversible or irreversible manner. For example, a still image may be compressed into a Joint Photographic Experts Group (JPEG) format, a JPEG 2000 format, or the like. If a moving picture is recorded, a plurality of frames may be compressed according to Moving Picture Experts Group (MPEG) standards to generate a moving picture file.

Image data output from the CPU/DSP 170 is input to the storage/read controller 140 through the memory 130 or is input directly to the storage/read controller 140 without passing through the memory 130. The storage/read controller 140 stores the image data in the data storage 142 automatically or according to a signal input from the user. The storage/read controller 140 may read data about an image from the image file stored in the data storage 142, input the data to the display driver 162 through the memory 130 or another path to display the image on the display 164. The data storage 142 may be detachably installed in the apparatus 100 or may be permanently installed in the apparatus 100.

The CPU/DSP 170 may perform sharpening processing, color processing, blur processing, edge emphasis processing, image interpretation processing, image recognition processing, image effect processing, and the like. The image recognition processing may include face recognition processing, scene recognition processing, and the like. The CPU/DSP 170 may process a display image signal to display a corresponding image on the display 164. For example, the CPU/DSP 170 may perform a brightness level adjustment, a color correction, a contrast adjustment, an outline emphasis adjustment, a screen division, a generation of a character image and the like, an image synthesis, and the like. The CPU/DSP 170 may process a predetermined image signal and be connected to an external monitor to display a corresponding image on the external monitor. The CPU/DSP 170 may transmit image data generated by processing the predetermined image signal to the external monitor to display the corresponding image on the external monitor.

The CPU/DSP 170 executes programs stored in the program storage 150 or included in an additional module to generate control signals for controlling auto focusing, zoom changing, focus changing, auto exposure correcting, and the like and provides the control signals to the aperture driver 112, the lens driver 115, and the imaging device controller 119. The CPU/DSP 170 also controls overall operations of the elements of the apparatus 100 such as the shutter, a flash, and the like.

The manipulation unit 180 is an element through which the user may input a control signal. The manipulation unit 180 may include a shutter-release button, a power button, a wide-angle-zoom button, a telephoto-zoom button, and various other function buttons. The shutter-release button is used to input a shutter-release signal for exposing the imaging device 118 to light for a predetermined amount of time to take a picture. The power button is used to input a control signal for powering on and off the apparatus 100. The wide-angle-zoom button and the telephoto-zoom button are used to widen or narrow a view angle. The remaining function buttons are used to select a character input mode, a photographing mode, a playback mode, a white balance setup function, an exposure setup function, and the like. The manipulation unit 180 may be realized in any form appropriate for the user to input a control signal, such as a button, a keyboard, a touch pad, a touch screen, a remote controller, or the like.

Figure 2:
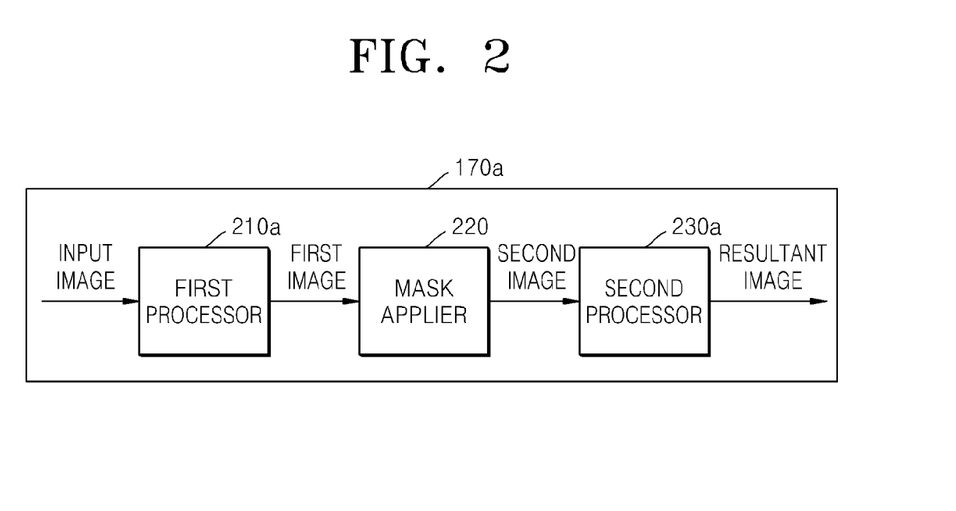
FIG. 2 is a block diagram of a central processing unit (CPU)/digital signal processor (DSP) 170a according to an exemplary embodiment of the invention.

FIG. 2 is a block diagram of a CPU/DSP 170a according to an exemplary embodiment of the invention.

The CPU/DSP 170a according to the current embodiment increases contrast of an input image, adds a mask to the input image, and controls brightness and/or colors in order to apply an image effect to the input image in real time. The CPU/DSP 170a includes a first processor 210a, a mask applier 220, and a second processor 230a.

The first processor 210a increases the contrast of the input image. Here, the first processor 210a increases the contrast of the input image by using a first look-up table (LUT). Pixel values of the input image may be Y values in YCbCr color coordinates of pixels of the input image, which correspond to brightness values. In the current embodiment, the brightness values (e.g., the Y values in the YCbCr color coordinates) of the input image may be processed together with color values (e.g., Cb and Cr values in the YCbCr color coordinates) of the input image. The type of pixel values to be processed according to the current embodiment may vary according to a type of an image effect. As described herein, different types of pixel values may be processed through different processes of applying a first LUT, adding a mask, and applying a second LUT. The brightness values of the input image are exemplarily described as the pixel values to be processed but instead, other types of pixel values may be processed by using a similar method to that by which the brightness values of the input image are to be processed.

The input image may be a live-view image captured and input in real time by the photographing unit 110 or an image captured in response to a shutter-release input. According to an embodiment of the invention, if the input image is a live-view image, an image effect may be applied to the live-view image in real time and output in a live-view format.

Figure 3:
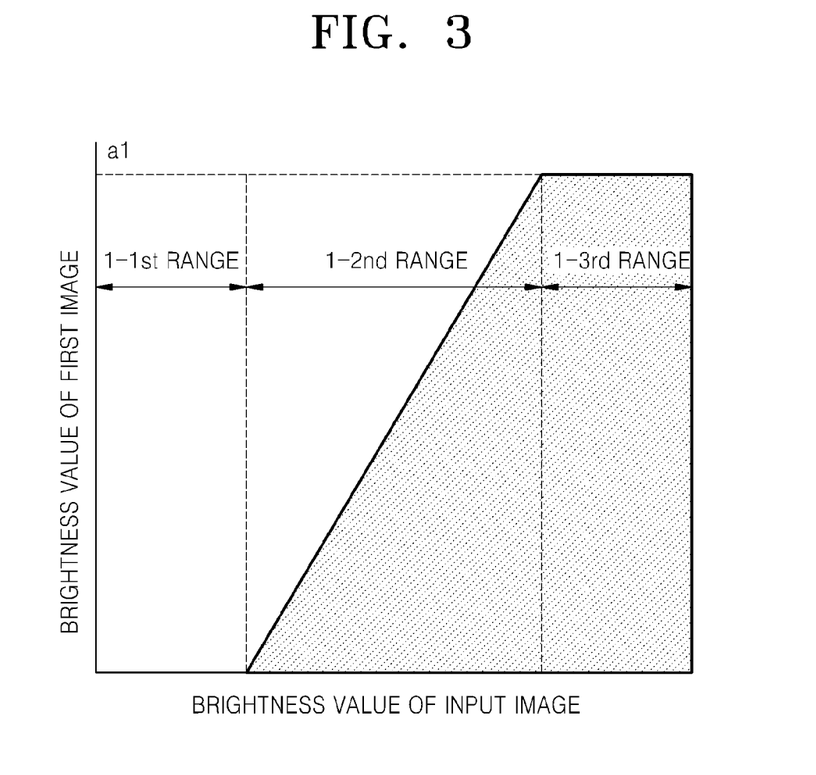
FIG. 3 illustrates a form of a first look-up table (LUT) according to an exemplary embodiment of the invention.

FIG. 3 illustrates a form of a first LUT according to an exemplary embodiment of the invention. The first LUT refers to a LUT by which the pixel values of the input image are to be converted into pixel values of a first image. As shown in FIG. 3, the first LUT differently processes ranges 1-$1^{st}$, 1-$2^{nd}$, and 1-$3^{rd}$ of the brightness values of the input image.

Pixels of the input image having a brightness value in the 1-$1^{st}$ range are adjusted to have a minimum brightness value. For example, if a total range of brightness values of a first image derived by applying the first LUT to the input image is between "0" and "255," the pixels of the input image having a brightness value in the 1-$1^{st}$ range are adjusted to have a brightness value of "0."

Contrast between pixels of the input image having a brightness value in the 1-$2^{nd}$ range increases. Brightness values of pixels of the input image having a brightness value in the 1-$2^{nd}$ range correspond to the total range of the brightness values of the first image. For example, if the total range of the brightness values of the first image is between "0" and "255," the brightness values of the input image in the 1-$2^{nd}$ range corresponds to the brightness values of the first image, which are between "0" and "255." The 1-$2^{nd}$ range of the first LUT may correspond to a line plot as shown in FIG. 3 but the line plot is merely an example. The form of the 1-$2^{nd}$ range of the first LUT is not limited as long as the first LUT increases the contrast of the input image. Also, the contrast of the first image may be adjusted according to a slope of the line plot in the 1-2$^{nd}$ range.

Pixels of the input image having a brightness value in the 1-3$^{rd}$ range are adjusted to have a maximum brightness value "a1" of the first image. For example, if the total range of the brightness values of the first image is between "0" and "255," the pixels of the input image having a brightness value in the 1-3$^{rd}$ range are adjusted to have a brightness value of "255."

In the first LUT according to the current embodiment, the 1-2$^{nd}$ range refers to a range of pixel values of the input image that will show an image effect according to the current embodiment. For example, if the 1-2$^{nd}$ range includes brightness values between "30" and "200," the image effect according to the current embodiment shows in the brightness values in the 1-2$^{nd}$ range. Also, as the 1-1$^{st}$ range becomes wider, the resultant image becomes darker. As the 1-3$^{rd}$ range becomes wider, the resultant image becomes brighter.

The first image processed and output by the first processor 210 is input to the mask applier 220. The mask applier 220 adds a mask having a pattern showing the image effect according to the current embodiment to the first image to generate a second image. In embodiments of the invention, the mask may be pre-stored and used or may be written only one time when entering an operation mode in which the image effect is adopted and used respectively. Also, a processing speed may be considerably improved by applying the image effect only via addition of the mask. In addition, the image effect may be applied by using a mobile apparatus having limited resources in real time and provided to a user. Since addition processing is to be performed only one time with respect to each of the pixels of the input image, a time required for performing the addition processing is considerably shorter than a time required for convolution processing, which is performed with respect to each of pixels in consideration of neighboring pixels.

Figure 4:
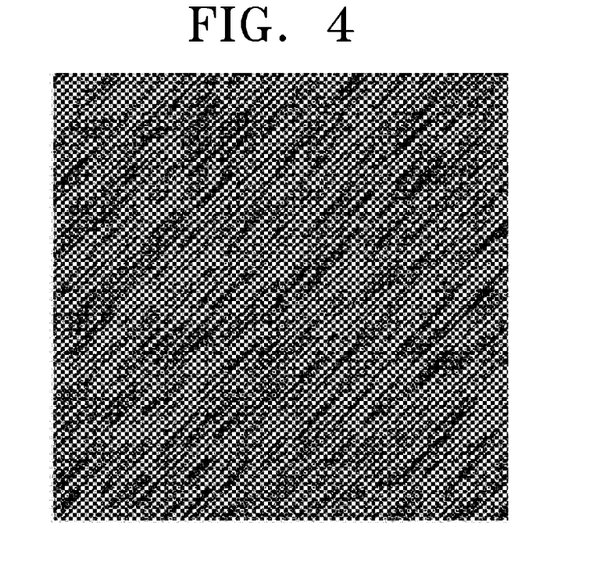
FIG. 4 illustrates a pattern of a mask according to an exemplary embodiment of the invention.

FIG. 4 illustrates a pattern of a mask according to an exemplary embodiment of the invention. The mask of FIG. 4 is to show a sketch effect. For example, the mask may be written in the same resolution as the input image. As another example, the mask may be written in a predetermined size and may be repetitively applied or may be enlarged and applied according to the resolution of the input image. The pattern of the mask may vary according to a desired image effect or may be selected by a user.

The second image, which is generated by the mask applier 220 by applying the mask to the first image, is input to the second processor 230a and is converted into a resultant image by applying a second LUT. The second processor 230a applies the second LUT to the second image to adjust a general tone of the second image. If the mask is applied through addition processing, a range of pixel values of the second image exceeds the total range of the pixel values of the input image. For example, if the total range of the brightness values of the input image is between "0" and "255" and a total range of brightness values of the mask is between "0" and "127," a total range of brightness values of the second image is between "0" and "382." If a total range of the second image increases more than that of the input image, the second image is totally brighter than the input image. Accordingly, in the current embodiment, the second LUT is applied to adjust the tone of the second image in order to prevent the tone of the input image from being excessively changed in processing.

Figure 5:
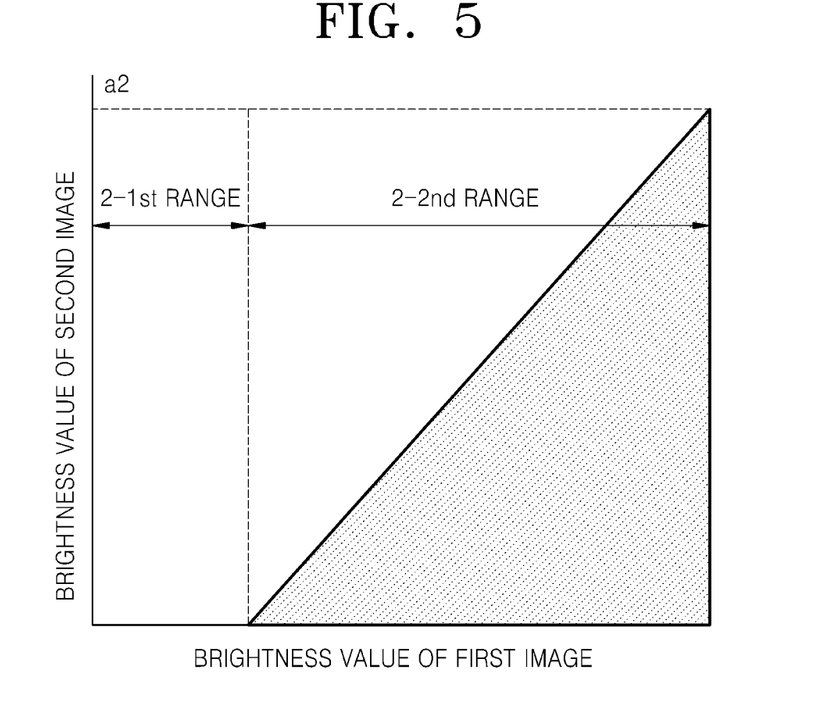
FIG. 5 illustrates a form of a second LUT according to an exemplary embodiment of the invention.

FIG. 5 illustrates a form of a second LUT according to an exemplary embodiment of the invention.

The second LUT refers to a LUT by which the pixel values of the second image are to be converted into pixel values of a resultant image. As shown in FIG. 5, the second LUT differently processes 2-1$^{st}$ and 2-2$^{nd}$ ranges of the brightness values of the second image.

Pixels of the second image having a brightness value in the 2-1$^{st}$ range are adjusted to have a minimum brightness value. For example, if a total range of brightness values of the resultant image is between "0" and "255," the pixels of the second image having a brightness value in the 2-1$^{st}$ range is adjusted to have a brightness value of "0." An image effect applied through a mask is removed from brightness values of the second image in the 2-1$^{st}$ range. Thus, a width of the 2-1$^{nd}$ range may be adjusted to adjust a range of the brightness values of the second image from which the image effect will be removed.

Pixels of the second image having a brightness value in the 2-2$^{nd}$ range are adjusted to be reduced. Since the mask is added to the second image, the total range of the brightness values of the second image exceeds the total range of the brightness values of the input image. Therefore, the second processor 230a adjusts the pixels of the second image having a brightness values in the 2-1$^{st}$ range to have the minimum brightness value and reduces brightness values of the second image in the 2-2$^{nd}$ range by using the second LUT. Thus, the second processor 230a adjusts the total range of the brightness values of the resultant image to be similar to the total range of the brightness values of the input image. For example, if the total range of the brightness values of the input image is between "0" and "255," the total range of the brightness values of the mask is between "0" and "127," and the total range of the brightness values of the second image is between "0" and "382," the second LUT may adjust the brightness values of the second image in such a way that the total range of the brightness values of the resultant image is between "0" and "255." For this purpose, a value of "a2" in the second LUT may be determined to correspond to a brightness value of "255."

The 2-2$^{nd}$ range of the second LUT is shown in a line plot in FIG. 5 but is not limited thereto. The second LUT may have any form appropriate for adjusting the tone of the second image. A slope of the 2-2$^{nd}$ range may be adjusted to adjust the contrast of the resultant image.

Figure 6:
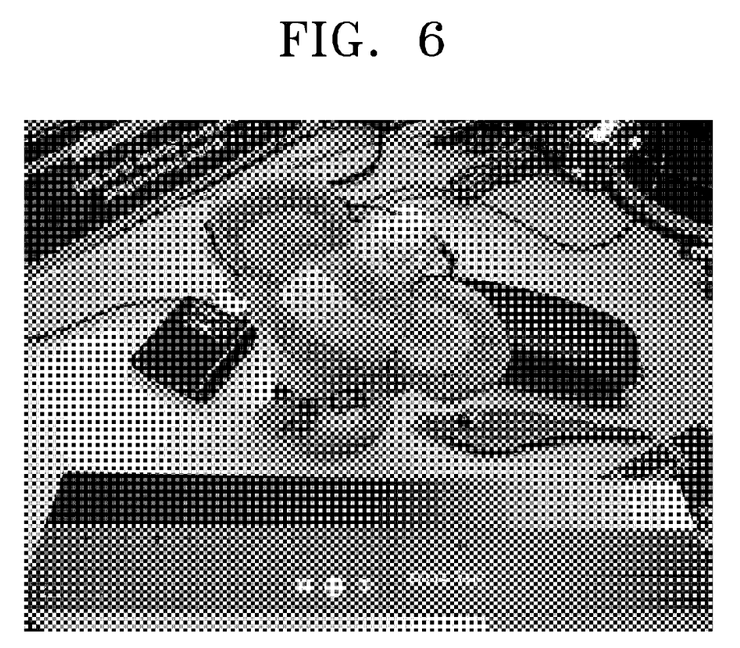
FIGS. 6 through 9 illustrate a process of applying a sketch effect to an input image to obtain a resultant image, according to an exemplary embodiment of the invention.
Figure 7:
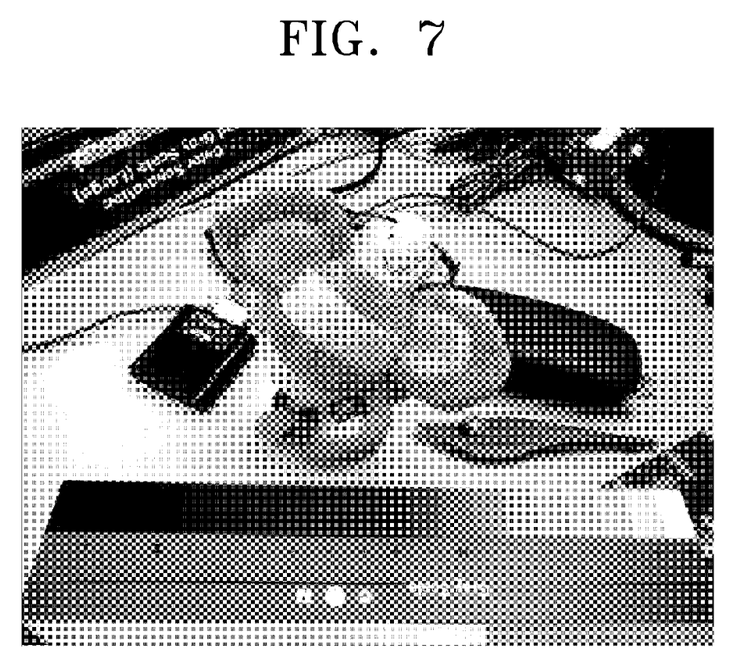
Figure 8:
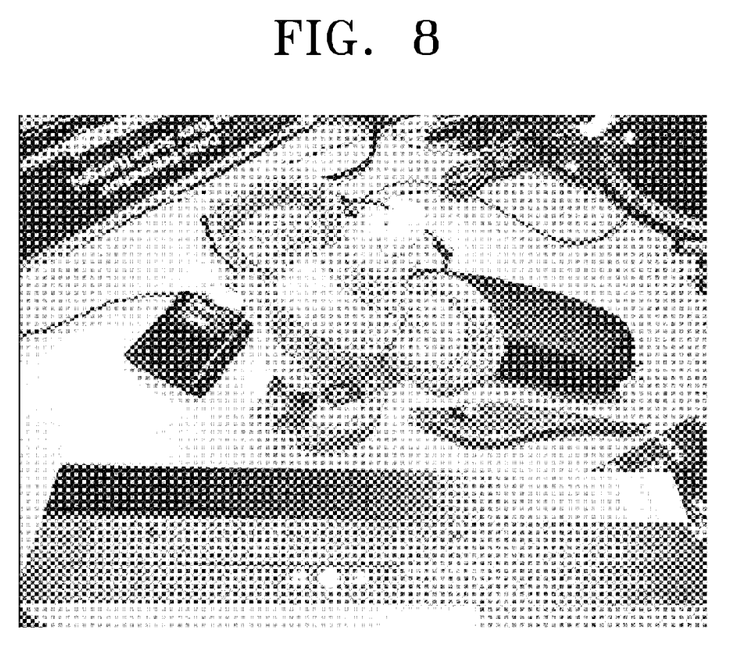
Figure 9:
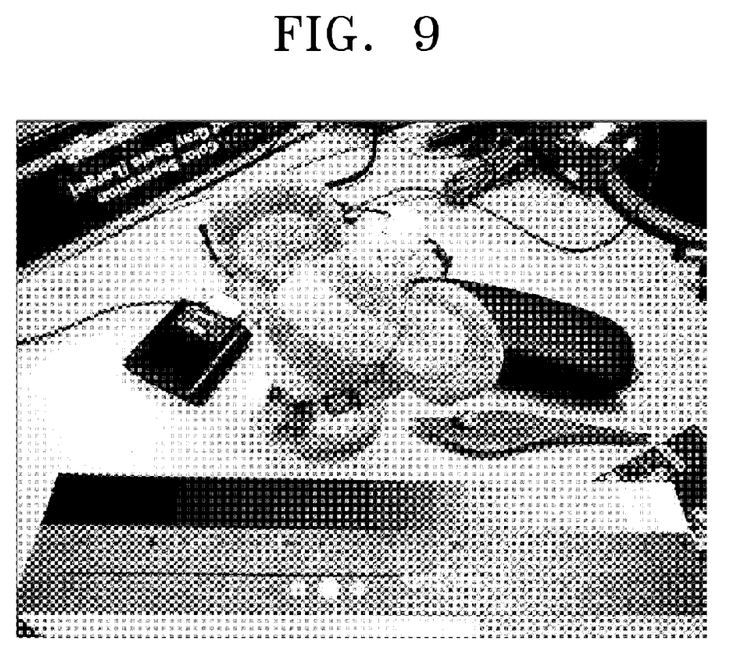

FIGS. 6 through 9 illustrate a process of applying a sketch effect to an input image to obtain a resultant image, according to an exemplary embodiment of the invention. FIG. 6 illustrates the input image, FIG. 7 illustrates a first image, FIG. 8 illustrates a second image, and FIG. 9 illustrates a resultant image. If a first LUT is applied to the input image of FIG. 6, the first image, having greater contrast than the input image, is generated from the input image as shown in FIG. 7. A mask is added to the first image to generate the second image of FIG. 8. If a second LUT is applied to the second image to adjust a tone of the second image, the resultant image of FIG. 9 is generated. If the second image of FIG. 8 is compared with the resultant image of FIG. 9, brightness of the resultant image of FIG. 9 is wholly lower than that of the second image of FIG. 8. Also, a sketch effect shows wholly from a dark part to a bright part in the second image of FIG. 8. However, since the sketch effect is removed from a dark part of the resultant image of FIG. 9, the resultant image shows a more natural sketch effect.

As observed from the resultant image of FIG. 9, the sketch effect may be applied to the input image without blurring edges of the input image and thus the input image remains clear. According to the embodiments of the invention, different types of image effects may be shown by using the similar processing as the sketch effect.

Figure 10:
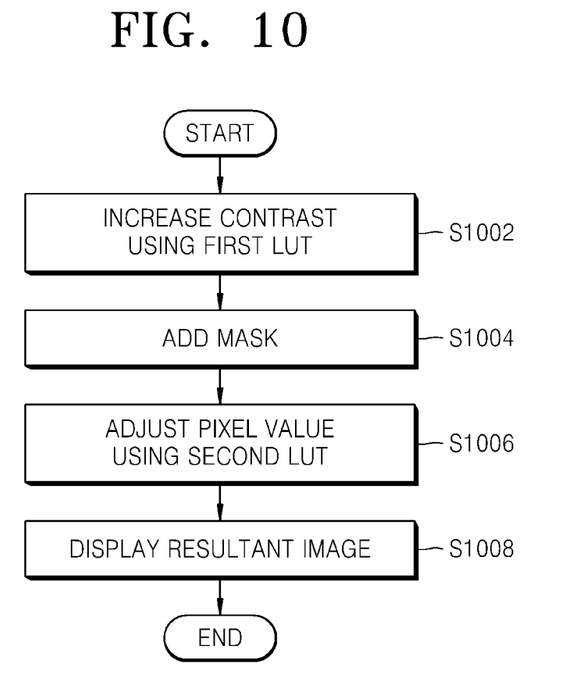
FIG. 10 is a flowchart illustrating a method of processing an image according to an exemplary embodiment of the invention.

FIG. 10 is a flowchart illustrating a method of processing an image according to an exemplary embodiment of the invention.

Referring to FIG. 10, in operation S1002, a first LUT is applied to an input image to increase contrast of the input image in order to generate a first image. In operation S1004, a mask having a pattern showing an image effect is added to the first image to generate a second image. In operation S1006, a second LUT is applied to the second image to adjust a tone of the second image in order to generate a resultant image. In operation S1008, the resultant image is displayed on the display 164.

Figure 11:
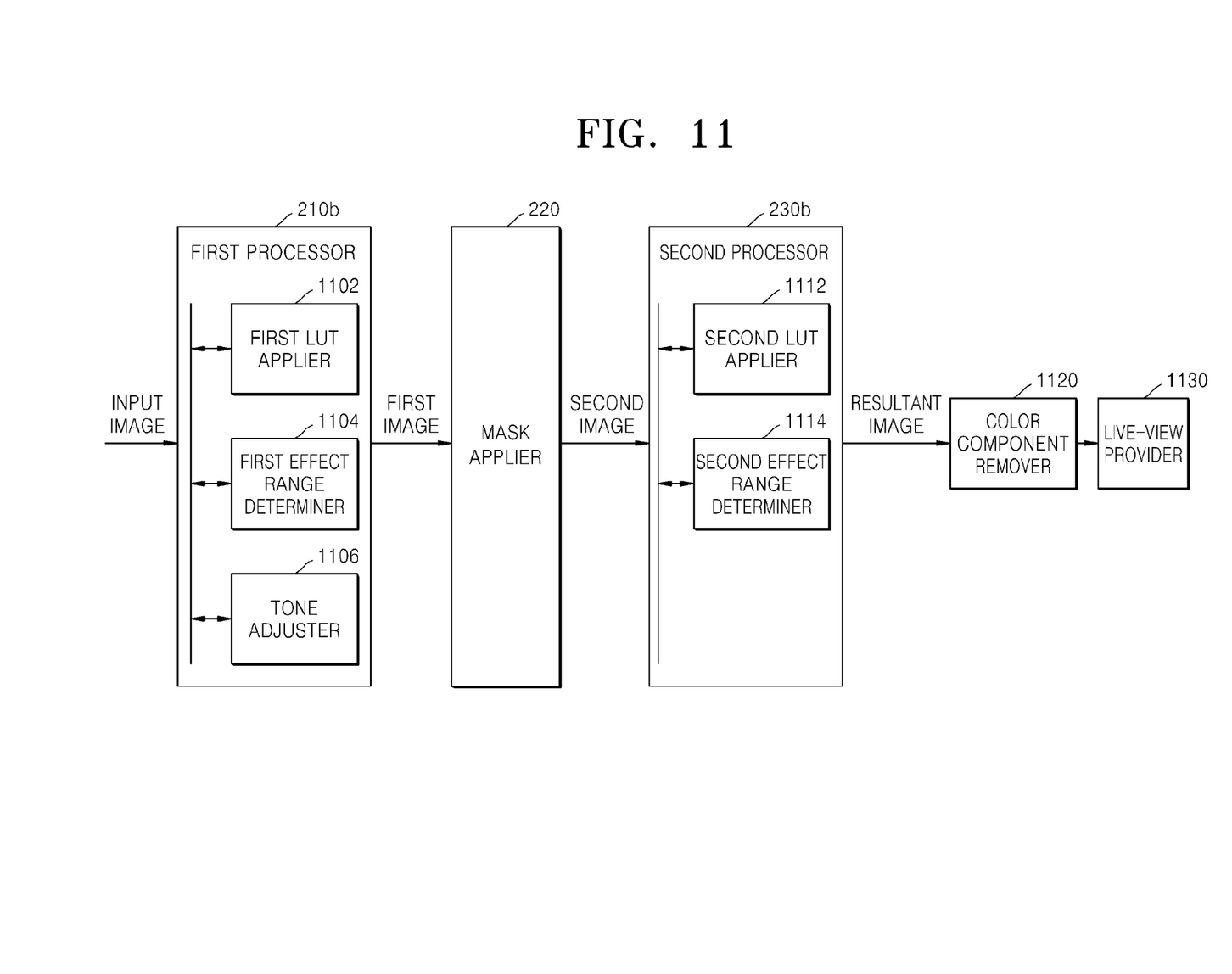
FIG. 11 is a block diagram of a CPU/DSP 170b according to another exemplary embodiment of the invention.

FIG. 11 is a block diagram of a CPU/DSP 170b according to another exemplary embodiment of the invention.

The CPU/DSP 170b according to the current embodiment adjusts a first LUT to adjust a range of pixel values that will show an image effect and a tone of a resultant image and adjusts a second LUT to adjust a range of pixel values that will not show the image effect. The CPU/DSP 170b applies an image effect to an input image input from the photographing unit 110 in real time in order to provide a live-view image with the image effect. The CPU/DSP 170b includes a first processor 210b, a mask applier 220, a second processor 230b, a color component remover 1120, and a live-view provider 1130.

The first processor 210b includes a first LUT applier 1102, a first effect range determiner 1104, and a tone adjuster 1106.

The first effect range determiner 1104 adjusts the width of a $1\text{-}2^{nd}$ range of the first LUT to adjust the range of the pixel values of the input image that will show an image effect provided by a mask. According to the embodiments of the invention, the image effect, which is applied through the mask, shows only in the pixel values of the input image corresponding to the $1\text{-}2^{nd}$ range of the first LUT. Thus, the first effect range determiner 1104 may adjust the width of the $1\text{-}2^{nd}$ range to adjust the range of the pixel values of the input image that will show the image effect. The width of the $1\text{-}2^{nd}$ range may be adjusted by a designer or by an input of a user performed through a user interface.

The tone adjuster 1106 adjusts widths of $1\text{-}1^{st}$ and $1\text{-}3^{rd}$ ranges of the first LUT to adjust the tone of the resultant image. The resultant image becomes darker with an increase in the width of the $1\text{-}1^{st}$ range but becomes brighter with an increase in the width of the $1\text{-}3^{rd}$ range.

The first LUT applier 1102 applies the first LUT, which has been adjusted by the first effect range determiner 1104 and the tone adjuster 1106, to the input image to increase contrast of the input image.

The second processor 230b according to the current embodiment includes a second LUT applier 1112 and a second effect range determiner 1114.

The second effect range determiner 1114 adjusts the $2\text{-}1^{st}$ range of the second LUT to adjust a range of pixel values of a second image from which the image effect applied through the mask will be removed. Pixels of the second image having the pixel value in the $2\text{-}1^{st}$ range are equally adjusted to a minimum pixel value through the second LUT. Thus, although the image effect is applied by the mask applier 220, the image effect may be selectively removed by the second LUT.

The second LUT applier 1112 applies the second LUT, which has been adjusted by the second effect range determiner 1114, to the second image to generate the resultant image.

The color component remover 1120 removes a color component from the resultant image. For example, if the input image is an image having an YCbCR format, the color component remover 1120 changes values of Cb and Cr to "0." Only if there is an image effect that may be applied by the apparatus according to the current embodiment that turns the input image into a black-and-white image, the color component remover 1120 may be included. If there is not, the color component remover 1120 may not be included. In the current embodiment, the color component remover 1120 is not limited to be installed at a node immediately after the second processor 230b but may be installed in another position. For example, the color component remover 1120 may be installed at a node immediately after the first processor 210b.

The live-view provider 1130 provides an image output from the color component remover 1120 or the resultant image output from the second processor 230b as a live-view image. For this purpose, the live-view provider 1130 provides the display driver 162 with the live-view image to which the image effect has been applied.

Figure 12:
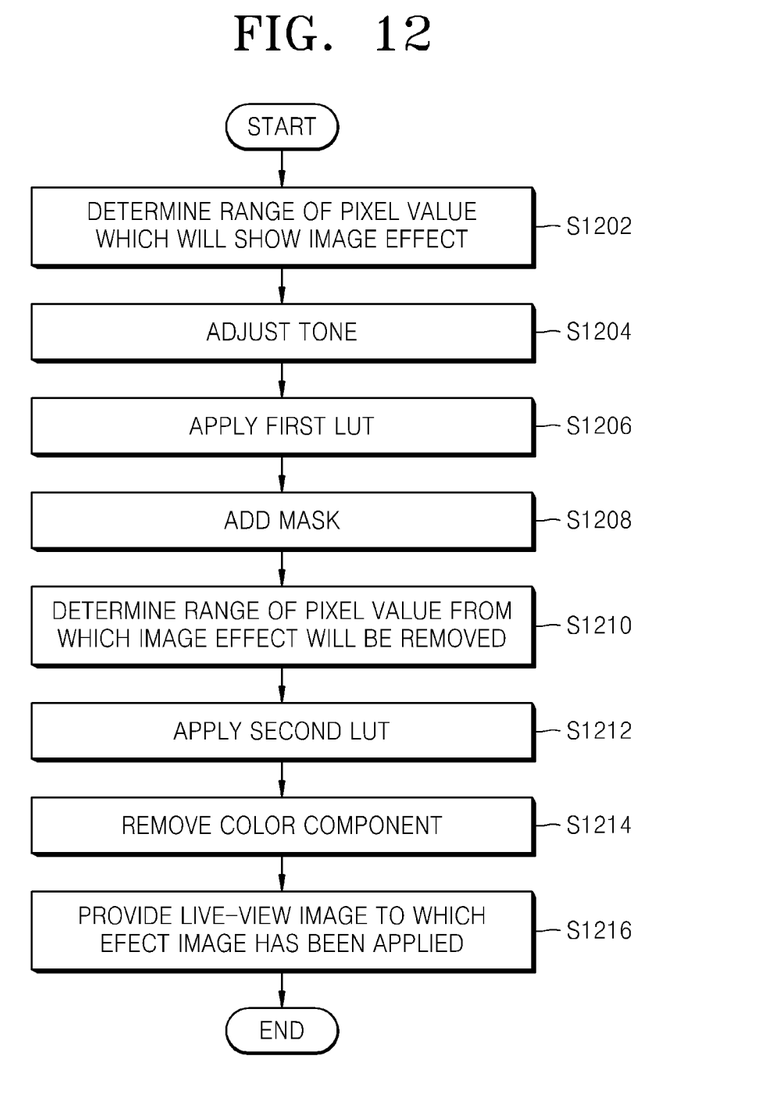
FIG. 12 is a flowchart illustrating a method of processing an image according to another exemplary embodiment of the invention.

FIG. 12 is a flowchart illustrating a method of processing an image according to another exemplary embodiment of the invention.

In operation S1202, a width of a $1\text{-}2^{nd}$ range of a first LUT is adjusted to determine a range of pixel values that will show an image effect. In operation S1204, widths of $1\text{-}1^{st}$ and $1\text{-}3^{rd}$ ranges of the first LUT are adjusted to adjust a tone of a resultant image. In operation S1206, the first LUT in which the widths of the $1\text{-}1^{st}$ and $1\text{-}3^{rd}$ ranges have been adjusted is applied to an input image to generate a first image. In operation S1208, a mask is added to the first image to generate a second image. In operation S1210, a width of a $2\text{-}1^{st}$ range of a second LUT is adjusted to adjust a range of pixel values of the second image from which the image effect applied through the mask will be removed. In operation S1212, the second LUT is applied to the second image to generate a resultant image. In operation S1214, a color component is removed from the resultant image. In operation S1216, a live-view image to which the image effect has been applied is provided.

According to another exemplary embodiment of the invention, a user or a designer may simply adjust an image effect that is to be shown in a resultant image. According to another exemplary embodiment of the invention, a user or a designer may actively adjust an image effect such as a sketch effect.

Figure 13:
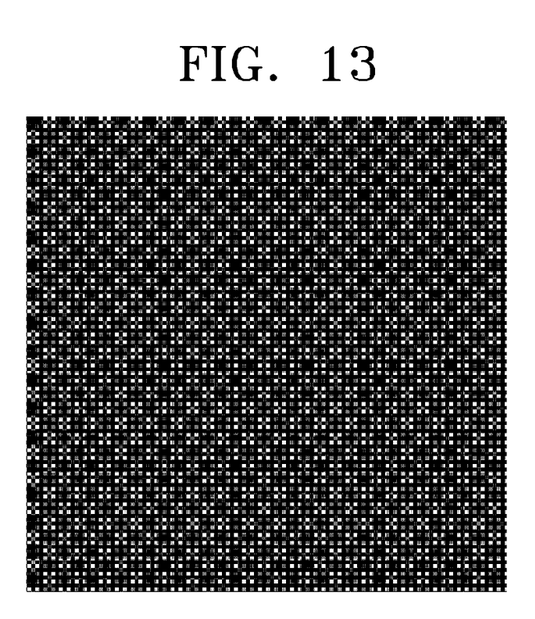
FIG. 13 illustrates a mask having a halftone dot effect.
Figure 14:
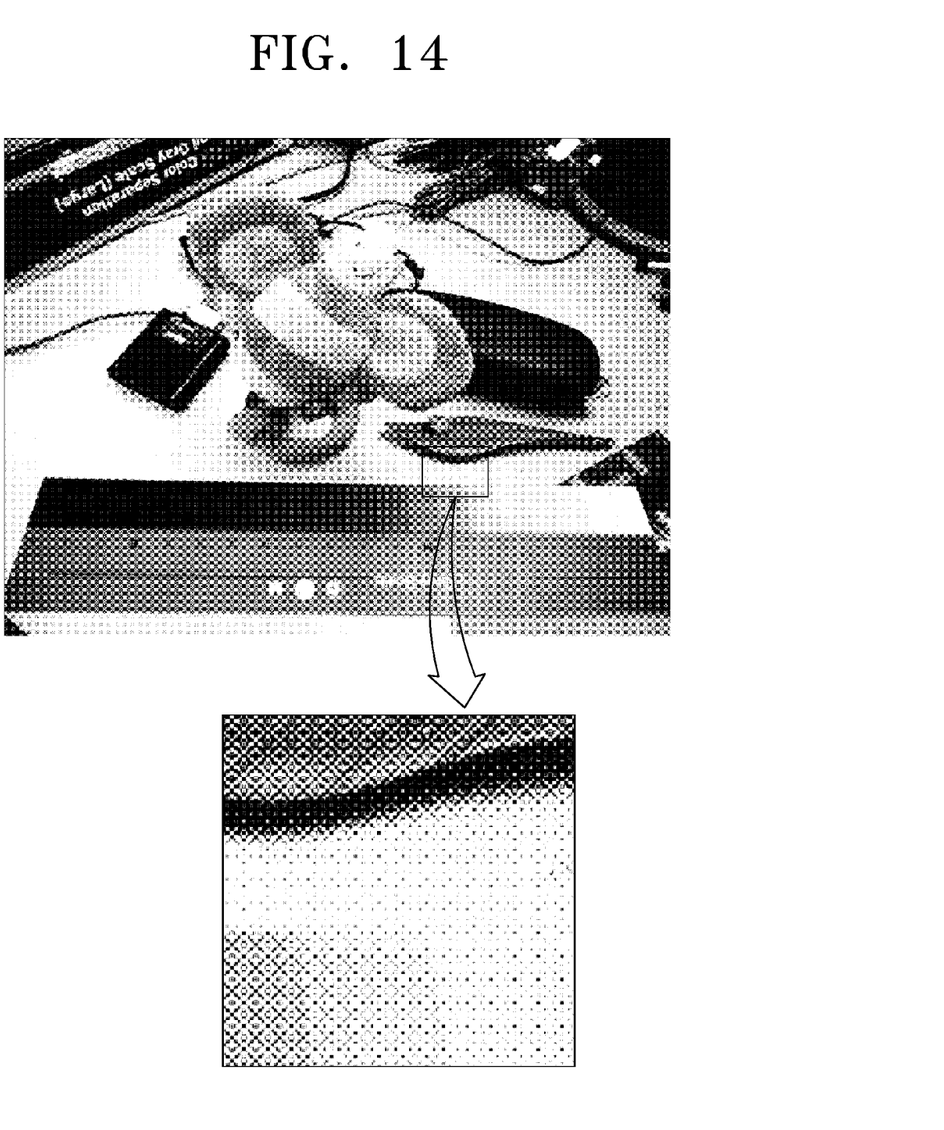
FIG. 14 illustrates a resultant image to which the mask having the halftone dot effect of FIG. 13 is applied.
Figure 15:
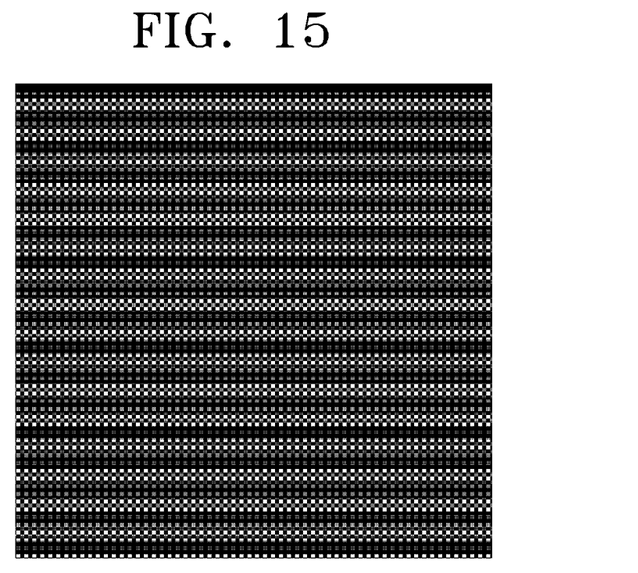
FIG. 15 illustrates a mask having a blurry television (TV) effect.
Figure 16:
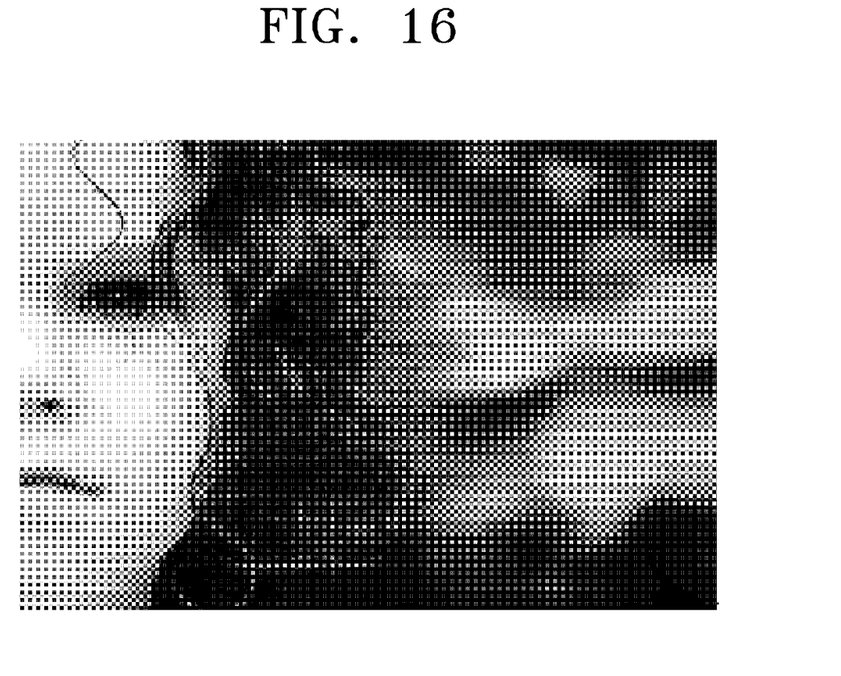
FIG. 16 illustrates a resultant image to which the mask having blurry TV effect of FIG. 15 is applied.

According to the embodiments of the invention, a pattern of a mask may be changed to change an image effect. For example, a halftone dot effect or a blurry TV effect may be applied to an input image. FIG. 13 illustrates a mask that shows a halftone dot effect, and FIG. 14 illustrates a resultant image to which the mask having the halftone dot effect has been applied. The halftone dot effect may be checked with reference to a second image formed by enlarging a part of the resultant image of FIG. 14. FIG. 15 illustrates a mask showing a blurry TV effect, and FIG. 16 illustrates a resultant image to which the blurry TV effect has been applied.

As described above, an apparatus and a method for processing an image according to the invention, an image effect may be applied to an image by using only a LUT and addition processing. Thus, the image to which the image effect has been applied may be provided to a user.

Also, a designer or the user may simply adjust a resultant image.

The invention can also be embodied as computer-readable code on a computer-readable storage medium. The computer-readable storage medium is any data storage device that can store data which can be thereafter read by a computer system. The computer-readable storage medium may be non-transitory and/or limited to physical medium. When the computer-readable code is read and executed from the computer-readable storage medium by the CPU/DSP 170, the computer-readable code executes operations of a method of processing an image according to the invention. The computer-readable code may be realized in various programming languages. Also, functional programs, codes, and code segments for accomplishing embodiments of the invention can be programmed by programmers skilled in the art to which the invention pertains.

Examples of the computer-readable storage medium include read-only memory (ROM), random-access memory (RAM), CD-ROMs, magnetic tapes, floppy disks, optical data storage devices, and carrier waves (e.g., transmission through the Internet). The computer-readable storage medium can also be distributed over network coupled computer systems so that the computer-readable code is stored and executed in a distributed fashion.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the invention.

What is claimed is:

1. A method of processing an image, comprising:
capturing the image;
receiving a user selection of an image effect;
increasing the contrast of the captured image according to a first look-up table (LUT) to generate a first image, wherein the first LUT is configured to adjust pixel values in a $1\text{-}1^{st}$ brightness range of low brightness values to a minimum brightness value of the pixel brightness values, increase contrast of pixel values in a $1\text{-}2^{nd}$ brightness range of intermediate brightness values, and adjust pixel values in a $1\text{-}3^{rd}$ brightness range corresponding to upper brightness values to a maximum brightness value of the pixel values;
adding a mask having a pattern showing the selected image effect to the first image to generate a second image;
removing the effect from at least part of the second image according to a second LUT, wherein the second LUT is configured to adjust pixel values in a $2\text{-}1^{st}$ brightness range of the second image corresponding to a low pixel value range to a minimum value of the pixel values and reduce pixel values in a $2\text{-}2^{nd}$ range of the second image to generate a resultant image; and
displaying the resultant image as a live-view image.

2. The method of claim 1, further comprising adjusting a range of the pixel values in the $1\text{-}2^{nd}$ brightness range to adjust a range of pixel values to which the image effect will be applied.

3. The method of claim 1, further comprising adjusting ranges of the pixel values in the $1\text{-}1^{st}$ and $1\text{-}3^{rd}$ brightness ranges to adjust a tone of the resultant image.

4. The method of claim 1, wherein the second LUT is configured to reduce the pixel values of the second image in such a way that a total range of pixel values of the resultant image corresponds to a total range of pixel values of the input image.

5. The method of claim 1, wherein the pixel values are brightness values.

6. The method of claim 5, further comprising removing a color component from the resultant image.

7. The method of claim 1, wherein the image effect is at least one of a sketch effect, a halftone dot effect, and a blurry television (TV) effect.

8. The method of claim 1, wherein increasing contrast is performed by a first processor; and removing the effect is performed by a second processor.

9. An apparatus for processing an image, comprising:
a first processor configured to
  receive a user selection of an image effect;
  increase a contrast of an input image to generate a first image according to a first look-up table (LUT) applier which uses a first LUT configured to adjust pixel values in a $1\text{-}1^{st}$ brightness range corresponding to a low pixel value range to a minimum value of the pixel values, increase contrast of pixel values in a $1\text{-}2^{nd}$ brightness range corresponding to an intermediate pixel value range, and adjust pixel values in a $1\text{-}3^{rd}$ brightness range corresponding to an upper pixel value range to a maximum value of the pixel values;
a mask applier configured to add a mask having a pattern showing the selected image effect to the first image to generate a second image;
a second processor configured to remove the effect from at least part of the second image according to a second LUT configured to adjust pixel values in a $2\text{-}1^{st}$ brightness range of the second image corresponding to a low pixel value range to a minimum value of the pixel values and reduce pixel values in a $2\text{-}2^{nd}$ range of the second image to generate a resultant image, and a live-view provider configured to display the resultant image as a live-view image.

10. The apparatus of claim 9, wherein the first processor is configured to adjust a range of the pixel values in the $1\text{-}2^{nd}$ brightness range to adjust a range of pixel values to which the image effect will be applied.

11. The apparatus of claim 9, wherein the first processor is configured to adjust ranges of the pixel values in the $1\text{-}1^{st}$ and $1\text{-}3^{rd}$ brightness ranges to adjust a tone of the resultant image according to a tone adjuster.

12. The apparatus of claim 9, wherein the second LUT is configured to reduce the pixel values of the second image in such a way that a total range of pixel values of the resultant image corresponds to a total range of pixel values of the input image.

13. The apparatus of claim 9, wherein the pixel values are brightness values.

14. The apparatus of claim 13, further comprising a color component remover configured to remove a color component from the resultant image.

15. The apparatus of claim 9, wherein the image effect is at least one of a sketch effect, a halftone dot effect, and a blurry TV effect.

16. A non-transitory computer program product, comprising a computer usable medium having a computer readable program code embodied therein, said computer readable program code adapted to be executed to implement a method of processing an image, said method comprising:

capturing the image;

receiving a user selection of an image effect;

increasing the contrast of the captured image according to a first look-up table (LUT) to generate a first image, wherein the first LUT is configured to adjust pixel values in a $1\text{-}1^{st}$ brightness range of low brightness values to a minimum brightness value of the pixel brightness values, increase contrast of pixel values in a $1\text{-}2^{nd}$ brightness range of intermediate brightness values, and adjust pixel values in a $1\text{-}3^{rd}$ brightness range corresponding to upper brightness values to a maximum brightness value of the pixel values;

adding a mask having a pattern showing the selected image effect to the first image to generate a second image;

removing the effect from at least part of the second image according to a second LUT, wherein the second LUT is configured to adjust pixel values in a $2\text{-}1^{st}$ brightness range of the second image corresponding to a low pixel value range to a minimum value of the pixel values and reduce pixel values in a $2\text{-}2^{nd}$ range of the second image to generate a resultant image; and displaying the resultant image as a live-view image.

* * * * *